(12) United States Patent
Rao et al.

(10) Patent No.: US 8,893,089 B2
(45) Date of Patent: Nov. 18, 2014

(54) FAST BUSINESS PROCESS TEST CASE COMPOSITION

(75) Inventors: Rajagopa Rao, Redwood City, CA (US); Stephan Daub, Walldorf (DE); Atul Sudhalkar, Sunnyvale, CA (US)

(73) Assignee: SAP SE, Walldorf (DE)

( * ) Notice: Subject to any disclaimer, the term of this patent is extended or adjusted under 35 U.S.C. 154(b) by 1788 days.

(21) Appl. No.: 11/868,891

(22) Filed: Oct. 8, 2007

(65) Prior Publication Data

US 2008/0086348 A1 Apr. 10, 2008

Related U.S. Application Data

(60) Provisional application No. 60/828,764, filed on Oct. 9, 2006.

(51) Int. Cl.
| | |
|---|---|
| G06F 9/44 | (2006.01) |
| G06Q 10/10 | (2012.01) |
| G06F 11/36 | (2006.01) |
| G06Q 10/06 | (2012.01) |

(52) U.S. Cl.
CPC ............ *G06Q 10/10* (2013.01); *G06F 11/3684* (2013.01); *G06Q 10/063* (2013.01)
USPC .......................................... 717/127; 717/124

(58) Field of Classification Search
None
See application file for complete search history.

(56) References Cited

U.S. PATENT DOCUMENTS

| | | | |
|---|---|---|---|
| 6,257,774 B1 | 7/2001 | Stack | |
| 6,601,233 B1 | 7/2003 | Underwood | |
| 6,810,494 B2 | 10/2004 | Weinberg et al. | |
| 6,907,546 B1 | 6/2005 | Haswell et al. | |
| 7,721,154 B1 * | 5/2010 | Jaamour et al. | 714/38.14 |
| 7,908,590 B1 * | 3/2011 | Min et al. | 717/124 |
| 2002/0053043 A1 * | 5/2002 | Friedman et al. | 714/25 |
| 2002/0083213 A1 | 6/2002 | Oberstein et al. | |
| 2005/0149868 A1 | 7/2005 | Katayama et al. | |
| 2005/0193286 A1 * | 9/2005 | Thatte et al. | 714/48 |
| 2006/0010163 A1 | 1/2006 | Herzog et al. | |
| 2006/0036958 A1 * | 2/2006 | Dreher | 715/764 |
| 2006/0106702 A1 * | 5/2006 | Pauw et al. | 705/35 |
| 2006/0230320 A1 * | 10/2006 | Salvador et al. | 714/38 |
| 2007/0088668 A1 | 4/2007 | Larab et al. | |
| 2007/0089091 A1 | 4/2007 | Larab et al. | |
| 2008/0126390 A1 * | 5/2008 | Day et al. | 707/102 |

OTHER PUBLICATIONS

Memon et al. "GUI Ripping: Reverse Engineering of Graphical User Interfaces for Testing", 2003, Proceedings of the 10th Working Conference on Reverse Engineering.*

(Continued)

*Primary Examiner* — Jue Louie
(74) *Attorney, Agent, or Firm* — Blakely Sokoloff Taylor & Zafman, LLP

(57) ABSTRACT

Methods and apparatuses enable fast business process test case composition. Instead of the labor intensive and error-prone manual test case composition of previous systems, a group of one or more test agents enables creation of a business process test based on monitoring a business process application. The test agents monitor a backend interface of the business process application that interfaces the application with a backend enterprise system. The test agents generate business process test components and an ordering for the business process test components based on the monitoring. From the test components and the monitoring, the test agents create a business process test. The entire creation process can be performed with little to no user interaction.

19 Claims, 4 Drawing Sheets

(56) References Cited

OTHER PUBLICATIONS

Elbaum et al. "Leveraging User-Session Data to Support Web Application Testing", Mar. 2005, IEEE Transaction on Software Engineering, vol. 31, No. 3.*

Sprenkle et al., "Automated Replay and Failure Detection for Web Applications", Nov. 2005, ASE'05.*

Thomas Mesenbourg, "Measuing Electronic Business: Definitions, Underlying Concepts, and Measurement Plans", U.S. Census Bureau, 2000, retrieved from: http://web.archive.org/web/20000510170941/http://www.census.gov/epcd/www/ebusines.htm.*

Notice of Allowance for U.S. Appl. No. 11/251,281, Mailed Feb. 22, 2010, 10 Pages.

Final Office Action for U.S. Appl. No. 11/251,281, Mailed Jul. 24, 2009, 27 pages.

Final Office Action mailed Sep. 19, 2008 for U.S. Appl. No. 11/251,281.

International Search Report & Written Opinion mailed May 15, 2008 for International Application No. PCT/US06/40390.

Non-Final Office Action dated May 8, 2008 for U.S. Appl. No. 11/251,281.

Non-Final Office Action for U.S. Appl. No. 11/251,281, Mailed Jan. 22, 2009, 24 pages.

Gamma, "Gamma InfoShuttle Data Migration Solutions for SAP", Gamma, An Applimation Company; products; Copyright 2007 Gamma Enterprise Technologies, Inc.; 2 pages http://www.getgamma.com/pro_ifs.html; retrieved Mar. 20, 2008.

Gamma, "Gamma InfoShuttle Rapid Test", Gamma InfoShuttle Rapid Test Data Sheet; Copyright 2007 Gamma Enterprise Technologies, Inc. (Apr. 2007); 2 pages Link from http://www.getgamma.com/pro-rt.html; retrieved on Mar. 20, 2008.

Gamma, "Gamma InfoShuttle Suite", Gamma InfoShuttle Suite Data Sheet; Copyright 2007 Gamma Enterprise Technologies, Inc., (May 2007); 2 pages; link from http://www.getgamma.com/pro_ifs.html; retrieved Mar. 20, 2008.

Gamma, "Gamma InfoShuttle Test Data Management for SAP", Gamma, An Applimation Company; Copyright 2007 Gamma Enterprise Technologies, Inc.; 2 pages http://www.getgamma.com/pro_rt.html; retrieved Mar. 20, 2008.

Mercury, "Automating Performance Testing for Predicting System Behavior and Performance", Copyright 2006 Mercury Interactive Corporation WP-1083-1106; www.mercury.com.

Mercury, "Mercury Business Process Testing: Test Automation Focused on your Business", Copyright 2004 Mercury Interactive Corporation WP-1048-0105; 14 pages www.mercury.com.

Non-Final Office Action for U.S. Appl. No. 11/868,897, Mailed Jul. 29, 2010, 14 Pages.

Notice of Allowance and Fee for U.S. Appl. No. 11/868,897, Mailed Jan. 7, 2011, 7 Pages.

Non-Final Office Action for U.S. Appl. No. 11/86,905, Mailed Jun. 7, 2011, 16 Pages.

Notice of Allowance for U.S. Appl. No. 11/511,984, Mailed Jun. 23, 2011, 16 Pages.

Notice of Allowance for U.S. Appl. No. 11/868,905, Mailed Nov. 10, 2011, 11 Pages.

Bunte, Sven, et al., "*Improving the Confidence in Measurement-Based Timina Analysis*", 2011, *IEEE*, pp. 144-151.

* cited by examiner

FAST BUSINESS PROCESS TEST CASE COMPOSITION

This application claims priority to Provisional Patent Application No. 60/828,764 filed on Oct. 9, 2006 and entitled "Adaptive Business Process Change Verification".

FIELD

Embodiments of the invention relate to verifying business process changes, and more particularly to business process test case composition with componentized test case building blocks.

BACKGROUND

Businesses increasingly rely on business processes to accomplish various tasks within the organization. The business software that is used to implement the business processes becomes critical to the organization. Some software (e.g., SAP business software of SAP AG of Walldorf, Germany) allows customization and modification of the business process applications. Changes to the business processes may be made frequently (e.g., weekly or even daily) in some organizations. Prior to implementing a change in the business process software, the organization would ideally verify/validate the change to ensure the change accomplishes what is desired, and does so correctly without interruption to the normal flow of the organization. However, current methods of verification of the business process changes are expensive, time-consuming, and often require tradeoffs between reliability and cost and/or time.

Currently, business software is tested in one of two ways: manually, or via record and playback/scripting. Manual testing involves having people sit in front of a controlled environment and run the proposed changed business software following written test instructions. Testing can only be performed by human interaction with the system on which the software is installed. Manual testing is deficient in that the testing time is very high, and the scope of tests possible is very small. The risk that an error will "make its way through" the testing is relatively high. The inefficiency and cost aspects to manual testing makes manual testing a generally unacceptable procedure.

Record and playback testing traditionally involves recording an entire sequence of activities that a particular participant in the business process would perform. However conventional record and playback requires that the test setup be an exact system duplicate of the recording. Variations between the systems frequently fail the testing. Additionally, the testing system must be extremely stable, given that changes to the system will fail the recording. Even in systems where the test does not fail for minor system changes, there is generally a limited access for test systems to business process content. The result of the lack of content access is less flexibility than would be preferred for most system operators. Furthermore, program scripting has a significant drawback in that specific tests must traditionally be written and adapted manually for every change. All current scripting tools have proprietary components that require specialists in the tool to implement. The cost of maintenance can become significant and possibly prohibitive. Thus, record and playback/scripting requires controlled conditions that are very difficult to produce, and difficult to duplicate. The complexity increases the cost of the procedure and does not guarantee the desired outcome.

SUMMARY

Methods and apparatuses enable fast business process test case composition. A test suite having one or more modules enables creation of a business process test based on monitoring a business process application. The test suite monitors a backend interface of the business process application that interfaces the application with a backend enterprise system. The test suite generates business process test components and an ordering for the business process test components based on the monitoring. From the test components and the monitoring, the test suite creates a business process test.

In one embodiment, the test suite reads metadata defining user interface screens for a business process flow, and derives test components from the metadata. The test suite may monitor service requests generated for the backend enterprise system. In one embodiment, the test suite performs offline monitoring. In one embodiment the test suite performs online monitoring. Both online and offline monitoring can be performed and the results combined. Online monitoring may be real-time monitoring of a business process application as a business process flow is executed. The monitoring may include reading and interpreting a technical application flow inside a backend application stack. In one embodiment, the test suite derives application-flow rules and/or deviations to describe the technical application flow for the business process application. In one embodiment, the results of the monitoring are stored to a test component ontology map that provides the test suite with "intelligent" logic for determining how to create a test flow.

The business process test components may be reusable components that are stored and reused with other tests requiring the same component. In one embodiment, the business process test components are based on UI screen definitions for the business process flow. Such UI screen definitions can be defined in a UI description table that includes descriptions of the fields and associations of various UI screens. The test components are ordered according to a flow determined by the test suite, and the test is created from the components with the particular flow. An example of creating the test may be the generation of a test script.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Figure 1:
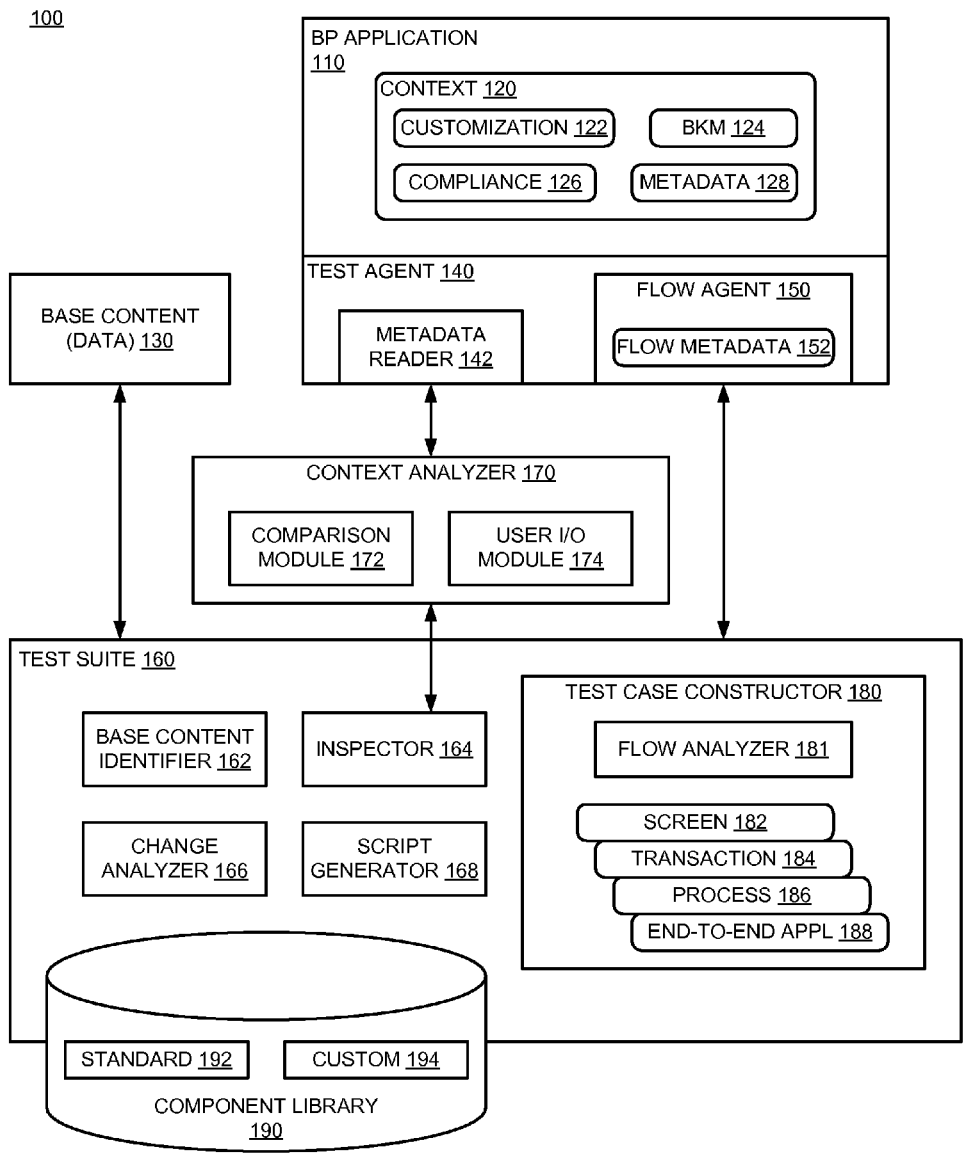
FIG. 1 is a block diagram of an embodiment of a system for generating a business process test case.

Descriptions of certain details and implementations follow, including a description of the figures, which may depict some or all of the embodiments described below, as well as discussing other potential embodiments or implementations of the inventive concepts presented herein. An overview of embodiments of the invention is provided below, followed by a more detailed description with reference to the drawings.

DETAILED DESCRIPTION

As provided herein, a test suite monitors an execution environment to determine how work of a user is performed with a business process application. The test suite can monitor the backend interfaces of the business process application to determine how to generate a business process test. Such backend monitoring provides more information more flexibility than normal testing or record and playback techniques. Even in systems that record business process application activity, the recording or monitoring has traditionally been performed at a front-end of the business process application. The front-end generally refers to the user interface (UI), where the data that is rendered and presented to the user. Thus, traditional business application activity monitoring is performed by monitoring what is presented to a user (UI monitoring or UI scanning). In contrast, as described herein, a test suite has the ability to monitor a backend, where the business process application interfaces with the underlying enterprise system or systems that provide, change, and store the content (e.g., business objects) represented by fields or forms on the user interface screen. Such backend monitoring may be referred to as system "Inspection," referring to the more detailed inspecting of the system from the technical interface rather than the display perspective. The test suite may also monitor or at least have the ability to access what screens would be provided to a user (as described in more detail below), which may be performed in conjunction with or in addition to monitoring the backend interface.

Monitoring the backend interfaces can include monitoring the service requests made to the backend enterprise systems. The system has access to the UI description table that indicates what UI components are available, and what properties they have. The test suite uses such information to compare against the monitored services to determine how a user interacts with the business process application. Any other metadata that indicates UI component information could also be read. Interactions and metadata can be persisted across multiple tests, in one embodiment, to enable the test suite to build up an ontology map. Thus, the test system can understand (e.g., via the ontology map) how a business process application is used, and what parameters and services are involved in the use of the business process application.

The test suite can then generate test components that represent discrete UI screens for a business process workflow. The test components are reusable, and can be applied to any of a number of different workflows or scenarios as executed from the business process application. The test case includes the test components with accompanying test data for an expected result (response) from the enterprise system. Based on the workflow(s) as monitored from the operation of the business process application, the test suite can generate a test script that applies the test components and test data. The test suite enables adaptive testing that reduces or eliminates the need for user input, and improves upon traditional monitoring and recording techniques.

In one embodiment, a test agent in the test target is coupled to the test suite. The test agent can observe or inspect the work flow of the test target, and the test suite (e.g., via an analyzer component) generates flows according to observed (i.e., in response to recorded) behavior, and alternatively, or in addition, to behavior indicated in a file or metadata or through other means. Generating the flow may include concatenating multiple test components, which might be any of: multiple screens to a transaction, multiple transactions to a business process, and/or multiple business processes to a complete end-to-end application. Also, non-user interface functionality can be captured for test component creation, for example, software programs without a user interface, interface modules such as enterprise services, request for comments (RFCs), and business application program interfaces (business APIs). Thus, based on work flow and context, the test suite can generate a test case, or a sequence of test components, matching the exact system for testing. The inspection of test components and analyzing of flows can be performed via a background task without user interface, meaning that no actual processes have to be executed to verify a change to a business process. As a result, manual input may be significantly reduced or eliminated. Such a background task may include a monitor that accesses a backend application stack and reads/monitors the data on the stack.

FIG. 1 is a block diagram of an embodiment of a system for generating a business process test case. System 100 represents a system within an enterprise or organization. System 100 includes business process (BP) application 110, which represents a business application or business process to be tested or verified. Application 110 could also be referred to as a test target. Application 110 includes context 120, which makes application 110 unique or potentially unique from other test targets or business process application, or from out-of-the-box systems. The context may be specific to a particular instance of the application, and content accessed from a backend may be instantiated on application 110 in different ways on each system. For example, context 120 may include one or more customizations 122 that have been made to a base configuration. Customization 122 has configurations that match system 100 of the enterprise, rather than being general, or matching other systems. Such customizations may be provided, for example, via configuration parameters. BKM 124 represents best known methods or best practices for application 110. BKM 124 can be broken down, for example, by industry (e.g., oil and gas industry, banking industry, car manufacturing), geographic region (e.g., Europe, North America), etc. Context 120 may also include compliance data 126. Compliance data 126 represents one or more items that provide rules of procedure with one or more standards. The standards may be internal and exclusive to the enterprise, shared among business partners, industry standards, legal standards (i.e., government standards, such as Sarbanes-Oxley provisions), security policies, etc. Metadata 128 represents any type of data within the system that indicates information about one or more of the specific context items discussed above. In one embodiment, a system configuration may maintain context metadata that can be read and interpreted by test suite 160. The system configuration can be local to an executing system, or may reside in the enterprise backend.

Application 110 is based on base content 130, which represents out-of-the-box, or an initial configuration version of a business process or application. In one embodiment, tests content and/or test results are stored from one test to another. In such a case, base content 130 may represent a "previously-known-good" version or a previously tested version of a business process or application. Thus, test content for application 110 may be generated that represents a modification from a previous test of application 110. The adaptations of test content could therefore be incremental according to the changes made to application 110 over previous versions. In one embodiment, metadata 128 may represent a difference configuration, referring to information that indicates only what is different from base content 130, rather than having an entire configuration.

Application 110 further includes test agent 140. Test agent 140 includes metadata reader 142 that gathers metadata 128 from application 110. The gathered metadata can be analyzed (i.e., by test suite 160) to determine how to generate a test for the business process flow of application 110. For example, the test suite may indicate how application 110 differs from base content 130. The metadata gathered by metadata reader 142 can be analyzed by inspector 164 and change analyzer 166. Inspector 164 can access information related to backend system interfaces to determine how to generate test components. In one embodiment, test agent 140 includes flow agent 150 that generates flow metadata 152, which includes information about work flows in application 110. A work flow includes one or more sequences in which work is performed, and includes data related to how systems and data of application 110 are used.

In one embodiment, test agent 140 includes flow agent 150, which represents one or more components that observe and record user behavior with respect to application 110. Flow agent 150 may observe user behavior on the subject test target for a period of time (e.g., one week), or a number of uses (e.g., five complete uses of the business process). The observed behavior may indicate what components users select (i.e., what buttons or icons are pressed or used, and in what order), what screens a user follows to complete a task (e.g., what sequence of screens or operations a user follows), etc. The observed behavior provides information that can be later used to construct a test case that mirrors actual user behavior. Flow agent 150 can generate flow metadata 152 from observation, which provides metadata regarding the flow of operations and data on application 110, and may include some analysis of the data, or organization/grouping of the data (e.g., categories of data).

Metadata reader 142 may refer to a module that can read and parse data from a UI screen description table. Such a screen description table may reside in a backend and indicate what UI components are available, what fields are in the screens, what parameters or inputs are permissible, etc. Such metadata may be read online or offline, and interpreted by the test suite. Flow agent 150 may provide additional information via online metadata gathering. Flow metadata 152 refers to information about how the system operates in runtime. As used herein, "offline" monitoring refers to monitoring that can be performed whether or not the business process application is actively executing a business process. "Online" monitoring refers to monitoring when the business process application is in an active state and a business process is loaded for execution. The business process flow can be interpreted from the change of one screen to another within the business process application, together with the input that caused the flow change. As used herein, the change of the business process from one state to another, or from one phase to another may be referred to as application flow.

Offline monitoring as performed by test agent 140 can predictively indicate an application flow based on interpretation of the metadata descriptions. Online monitoring as performed by test agent 140 can provide an active "look" at the application by storing information from the application stack to indicate what is occurring within the application. That is, the execution instructions as well as input values or input commands will be placed on the application stack and control operation of the application. In one embodiment, the application flow can be interpreted for application-flow rules and application-flow deviations. "Application-flow rules" refer to the standard operation of the business process application with one or more business process flows. "Application-flow deviations" refer to exceptions, special cases, changes, etc., from standard operation. Together the standard operation and the deviations indicate a technical application flow, referring to the flow of the application from the command and input value level.

Test suite 160 represents a testing entity. Test suite 160 may provide test agent 140 and/or additional components for monitoring and analysis. In one embodiment, test agent 140 performs monitoring and test suite 160 provides analysis. In another implementation, test agent 140 can also provide some or all of the analysis. In one embodiment, test suite 160 includes base content 130 (i.e., in a repository of test content/data). In another embodiment, test suite 160 accesses base content 130 from where it is stored.

Test suite 160 includes multiple modules or components to generate the test content and possibly apply a test case to application 110. In one embodiment, applying the test case or testing the test target is performed by an entity external to test suite 160. Thus, test suite 160 generates the test content, which it provides to a test application tool. The following are possible components in one or more embodiments, but should be understood as only examples, and not as an exhaustive list, nor as a list of necessary components. In one embodiment, test suite 160 includes inspector 164, change analyzer 166, and script generator 168. As described above, test suite 160 receives or accesses base content 130 from which test content may be derived in addition to information from monitoring a backend interface. Base content identifier 162 enables inspector 164 and change analyzer 166 to determine what is the base content for application 110, and enables access to the base content. Base content identifier 162 may select from among multiple available copies of base content (e.g., different versions of application 110, or different base content for different test targets). To select base content, each test component has a unique identifier that matches the identity of application 110.

In one embodiment, test suite 160 includes test case constructor 180, which represents one or more components that enable test suite 160 to generate test content that incorporates work flow information. In some testing scenarios, test suite 160 generates one or more flows to construct an end-to-end test case, or different flows related to aspects of application 110 to be tested that are not necessarily end-to-end. Test case constructor 180 may include flow analyzer 181 that receives flow metadata 152 of flow agent 150, and analyzes user behavior information from flow metadata 152 and determines how the business process or application is actually used by users. For example, patterns of use (e.g., data access, service access, etc.) can be identified from flow metadata 152 generated by flow agent 150. In one embodiment, flow agent 150 and test case constructor 180 are part of a single entity of test suite 160. The analyzed information can inform test suite 160 of how application 110 is used in practice. Test case constructor 180 may determine what tests are appropriate (e.g., through heuristic or analytics algorithms) for application 110 based on the analysis of flow analyzer 181.

Context analyzer 170 obtains context information for application 110 and determines from the context how to generate a test case for the business process flow. In one embodiment, context analyzer 170 is part of inspector 164 and/or change analyzer 166. Thus, context analyzer 170 may represent functional components of inspector 164 and/or change analyzer 166. Alternatively, context analyzer 170 could exist wholly, or in part, as a separate component/entity. In one embodiment, one or more functional components of context analyzer 170 are part of test agent 140. Based on the difference(s) detected by context analyzer 170, test suite 160 generates test content adapted to match the context of application 110. Context analyzer 170 includes comparison module 172, which represents one or more components through which differences are determined between application 110 and base content 130, which may work redundantly to, or in conjunction with change analyzer 166. In one embodiment, context analyzer 170 includes user I/O (input/output) module 174. User I/O module 174 can enable user interaction with the context analysis. User I/O module 174 may, for example, provide a report that a user can verify to determine whether the analysis of test suite 160 matches what is known of application 110. The user may be able to make changes to the information, as necessary. Additionally, user I/O module 174 could allow a user to input specific information that the user wants test suite 160 to consider in generating test content. Thus, test suite 160 can adapt base content 130 independent of user input, and/or may include a user in the process through user I/O module 174.

Test case constructor 180 generates one or more flow scenarios, depicted by screen 182, transaction 184, process 186, and end-to-end application (appl) 188. The depicted cascading of each of these components illustrates the concept that test case constructor 180 can construct one from the other. For example, multiple screens 182 may be concatenated in a sequence to generate one transaction 184. Multiple transactions 184 can be concatenated in a sequence to generate one process 186. Multiple processes 186 can be concatenated in a sequence to generate end-to-end application 188. The sequence for each grouping is derived from information produced by flow analyzer 181. Flow analyzer 181 receives and interprets flow information from other components of test suite 180, and bases the test case flow on the monitoring of application 110 (online and/or offline monitoring).

Test suite 160 includes component library 190, which represents a database or library of components that can be used to generate a test case for application 110. Component library 190 provides reusable data objects that can be instantiated in different test cases. Component library 190 includes components as part of test suite 160. Such commonly provided components are referred to as standard components 192. Additionally, standard components 192 can be modified and/or additional components added to the library of components. Such components are referred to as custom components 194. In one embodiment, one or more of the components is a drag-and-drop component that enables relatively quick generation of test content.

With the test components and test architecture described herein, test suite 160 supports various aspects of testing that are currently handled manually. For example, test suite 160 can enables slim test system setup via triggering of professional applications to perform the slim test system setup. With the understanding of the test case, test suite 160 can provide detailed instructions regarding how to set up a test system. The detailed setup understanding is contrasted with the existing professional application setup (e.g., on SAP TDMS or Gamma InfoShuttle) that must be configured from scratch, without the benefit of the information available to test suite 160. Test suite 160 can enable a wizard to create test execution data based on information that test suite 160 gathers for "introspection" of screens and other functionality.

Additionally, test suite 160 can enable a more sophisticated analysis of a system than what is currently available. For example, an advanced analysis possible with test suite 160 includes information as to why a test case failed (e.g., which particular data input field had an incorrect value, missing user authorization, etc.) The advanced analysis renders test result analysis more efficient, which can expedite the testing procedure. Additionally, test suite 160 can provide consolidated test results. For example, a pie chart can be generated that displays how many high priority test areas resulted in how many severe errors.

Figure 2:
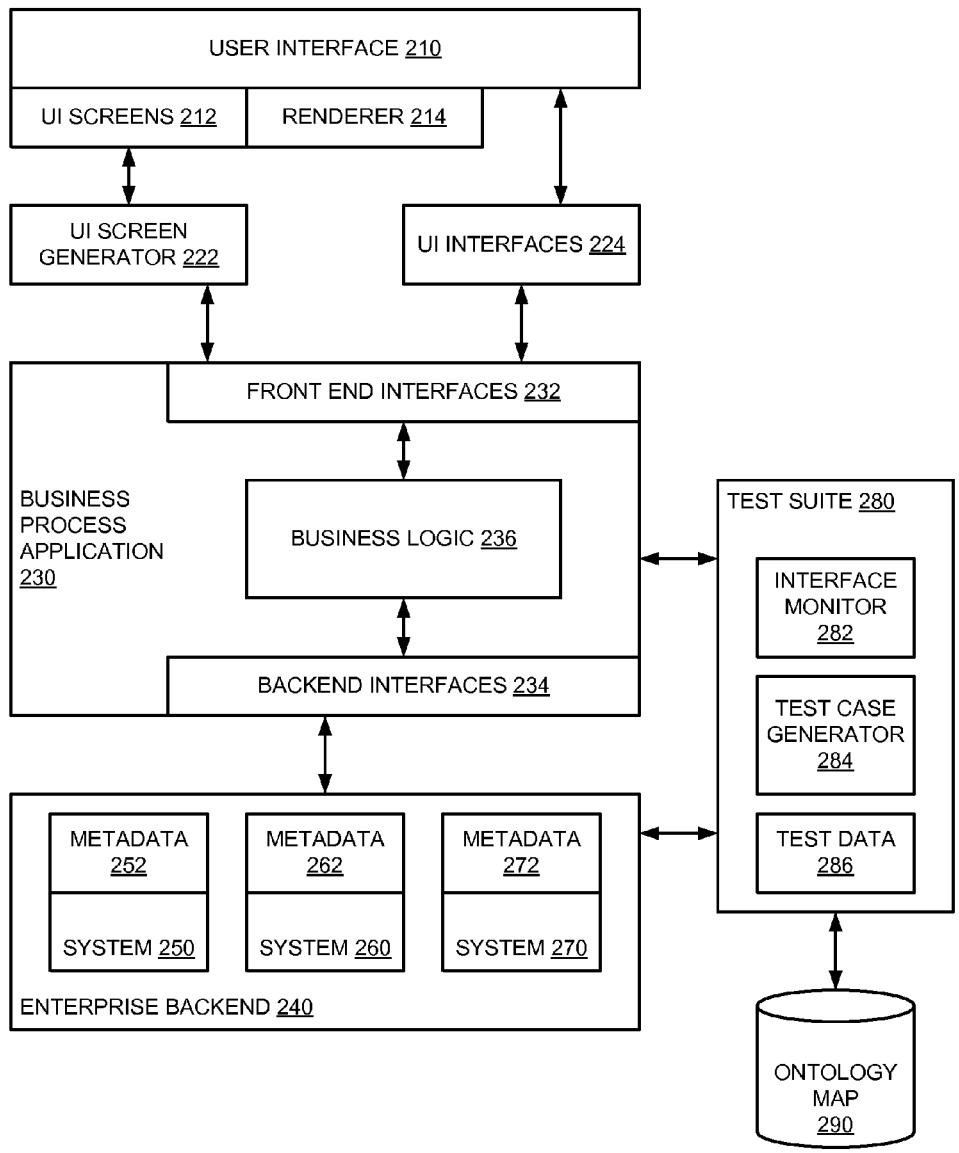
FIG. 2 is a block diagram of an embodiment of a system having a test suite for generating a business process test case.

FIG. 2 is a block diagram of an embodiment of a system having a test suite for generating a business process test case. System 200 illustrates a system on which a business process application is executed, including the front-end and the backend. The front-end and the backend may frequently be physically separate devices. The front-end includes user interface 210, which provides an interactive environment in which a user can see data rendered and interact with that data. User interface 210 may include graphical display devices as well as any of a number of user input devices. User interface 210 displays UI screens 212, which represent a particular view of data or a state of the application or business process flow. UI screens 212 are rendered by renderer 214, which represents known software and hardware components for converting data to a display for a user.

UI screen generator 222 provides components to the user access device, which is the front-end device. UI screen generator 222 is generally based on business logic associated with the application for which the screens are generated. The generation of UI screens may be based on UI description tables, which provide associations of components to input fields, and inputs to transitions or changes in the UI. UI interfaces 224 represent the hardware and/or software (e.g., drivers) necessary to interact with a user.

Business process application 230 represents a business process application according to any embodiment described herein. Business process applications can exist for different systems in an enterprise (e.g., customer relationship management (CRM), supply chain management (SCM), human resources (HR), etc.). The business process applications can each execute one or more business processes. Business logic 236 represents the logic of the application, which provides the functionality of the application. Business process application 230 interfaces with a user via front-end interfaces 232, which is an abstraction to represent any user interface layer for display (such as UI screens 212) and other types of input/output (I/O) devices.

Business process application 230 also includes one or more backend interfaces 234. Backend interfaces 234 represent one or more mechanisms with which the business process application or a business process being executed in the application accesses enterprise backend 240. In one embodiment, backend interfaces 234 include service request mechanisms, such as in an enterprise services architecture (ESA). Backend interfaces 234 may include a backend application stack. Such a stack may be implemented to monitor the application and provide tracking of instructions and data resulting from execution of a business process. In one embodiment, business process application 230 is generated as an instance of an application via an application server. In such a case, the application stack may be created as part of the runtime resources allocated to the application instance.

Enterprise backend 240 can include any number of backend systems, each of which may provide data objects and/or services to business process application 230. Such systems are represented by systems 250, 260, and 270. Metadata 252, 262, and 272 are associated, respectively, with systems 250, 260, and 270. Although depicted with the individual systems, the metadata may actually be located in a single location. That is, there may be metadata associated with access to each of the different systems. The metadata may be in a consolidated location, such as a runtime resource table, such as the UI description table, or some other data resource. Each system may have distinct information regarding protocols or parameters for access, or even security. Such information can be kept to be provided to a business test case to enable the operation of the test case on the system. In one embodiment, enterprise backend 240 includes an application server, which may include an application stack for application 230.

Test suite 280 may include a number of components to provide test suite functionality according to any functionality that is described herein. For example, interface monitor 282 represents one or more functional components or mechanisms through which test suite 282 may monitor backend interface 234. Note that there may be significant distinction in different mechanisms employed for interface monitoring. For example, a database or table access module may access data stored in records or tables that indicates information about various UI screens and/or their relationships with each other or other data. Another mechanism may be a stack monitor that reads data from an application stack. Such a stack monitor could be an inline module that intercepts and forwards data/instructions to the stack, or a parallel component that reads the data placed on the stack. The parallel module could receive the data in addition to the stack, or could read the data written to the stack. Another mechanism may be a request monitor that records what service requests were made to the backend systems, and with what input parameters. The return data could also be recorded.

Test case generator 284 provides the ability to gather and interpret the data monitored at the interfaces, and may include any of the functional elements of test suite 160 of FIG. 1. Interpreting the data can include determining how the flow of operation functions for a particular business process and/or application. Application-flow rules can be generated corresponding to the information. The system can also determine an ordering for each item monitored. Thus, associations between items can be determined, as well as dependencies and regular or expected flows. All such information can be stored for use in generating a test case. In one embodiment, such information is persisted beyond the scope of a single business process or even beyond the scope of a particular application. The information can be stored in ontology map 290. As will be understood, an ontology map in this case would provide a data model representing the various UI components of the business process(es) and relationships between those components. There could potentially be dozens, if not hundreds or thousands of UI components. There could be any of a number of relationships among the various components. Thus, ontology map 290 represents one known mechanism to provide "intelligence" to the test suite in making determinations about the generation of test cases. Test case generator 284 can use any form of logic, algorithms, determination sets, etc., to generate a test case from monitored data. Note that in certain test cases, only a fraction of available content may be used, as would be determined by test suite 280.

Test data 286 represents a test case as generated within test suite 280. Test data 286 will ideally allow a system administrator to test the validity of a business process on the system. Thus, changes to the business process can be applied to the test case, and the results determined by executing the test case on business process application 230. Alternatively, changes to the business process application or some enterprise service may be testable with test data generated as described herein.

Figure 3:
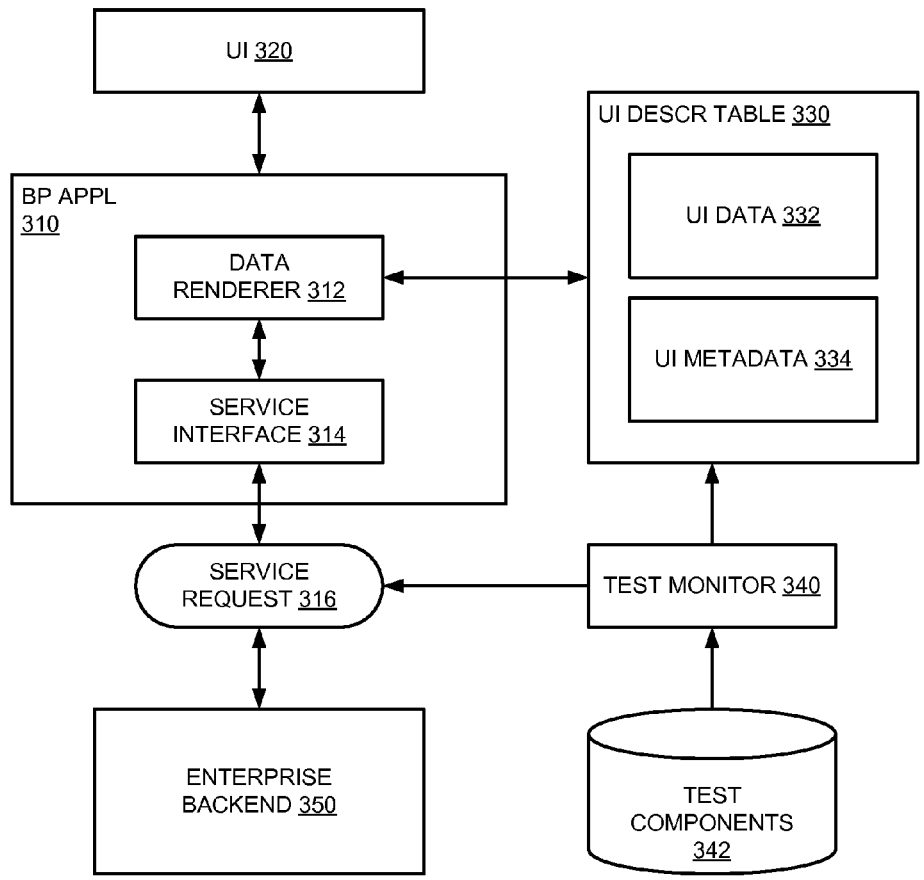
FIG. 3 is a block diagram of an embodiment of a system with a test monitor that monitors service requests and a user interface description table of a business process application.

FIG. 3 is a block diagram of an embodiment of a system with a test monitor that monitors service requests and a user interface description table of a business process application. System 300 represents a system with a business process application and a test monitor. The test monitor may be one or more components of a test suite as described herein.

System 300 includes business process (BP) application (appl) 310 that executes a business process. The execution includes access to enterprise backend 350. Business process application 310 includes data renderer 312, which represents data layer components of the application, which provides a representation of data to a user on UI 320. In one embodiment, business process application 310 includes service interface 314, which represents interfaces for an ESA-based enterprise. Such interfaces may include data agents that have particular components for communicating with the backend. Service interface 314 generates one or more service requests 316 for data from enterprise backend 350. Service request 316 may specify the service or data desired and access parameters necessary to obtain a result.

In one embodiment, system 300 includes UI description (descr) table 330, which represents one or more items that provide UI data for rendering by data renderer 312. That is, the business process application can indicate certain data to data renderer 312, which then accesses UI description table 330 to determine how to render the particular data generated within business process application 310. As is common with a table, information can be stored by row and/or column that is accessible via a key or handle to obtain graphic representations or other data related to the handle. UI description table 330 may include UI data 332, which provides the actual UI screens for rendering, as well as UI metadata 334. UI metadata 334 provides information about the UI screens, such as information about how the screens are used, conditions related to the use of the screens, inputs, etc. Such metadata information can be analyzed by test monitor 340 to obtain information that indicates how to construct a test case for the system. Test monitor 340 provides functionality similar to Inspector 164 of FIG. 1.

Test monitor 340 embodies any of the various monitoring mechanisms described herein. Test monitor 340 is shown more particularly accessing UI description table 330 to access UI metadata 334. Test monitor 340 is also shown monitoring service request 316, and monitoring the various requests that may be made to enterprise backend 350. In one embodiment, test monitor 340 is coupled to test components 342, which represents components that are generated responsive to the monitoring. In one embodiment, test components 342 are generated relative to one particular type of monitoring, which may include ordering the test components in a test case. The test case and/or a test component may be modified based on a different type of monitoring. Thus, if a test case is preliminarily set out based on monitoring UI metadata 334, the test case may be monitored based on information obtained while monitoring service request 316. The reverse case could also occur in certain implementations.

Various components described herein may be a means for performing the functions described. Each component described herein includes software, hardware, or a combination of these. The components can be implemented as software modules, hardware modules, special-purpose hardware (e.g., application specific hardware, application specific integrated circuits (ASICs), digital signal processors (DSPs), etc.), embedded controllers, hardwired circuitry, etc. Software content (e.g., data, instructions, configuration) may be provided via an article of manufacture including a machine readable medium, which provides content that represents instructions that can be executed. The content may result in a machine performing various functions/operations described herein. A machine readable medium includes any mechanism that provides (i.e., stores and/or transmits) information in a form accessible by a machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A machine readable medium may also include a storage or database from which content can be downloaded. A machine readable medium may also include a device or product having content stored thereon at a time of sale or delivery. Thus, delivering a device with stored content, or offering content for download over a communication medium may be understood as providing an article of manufacture with such content described herein.

Figure 4:
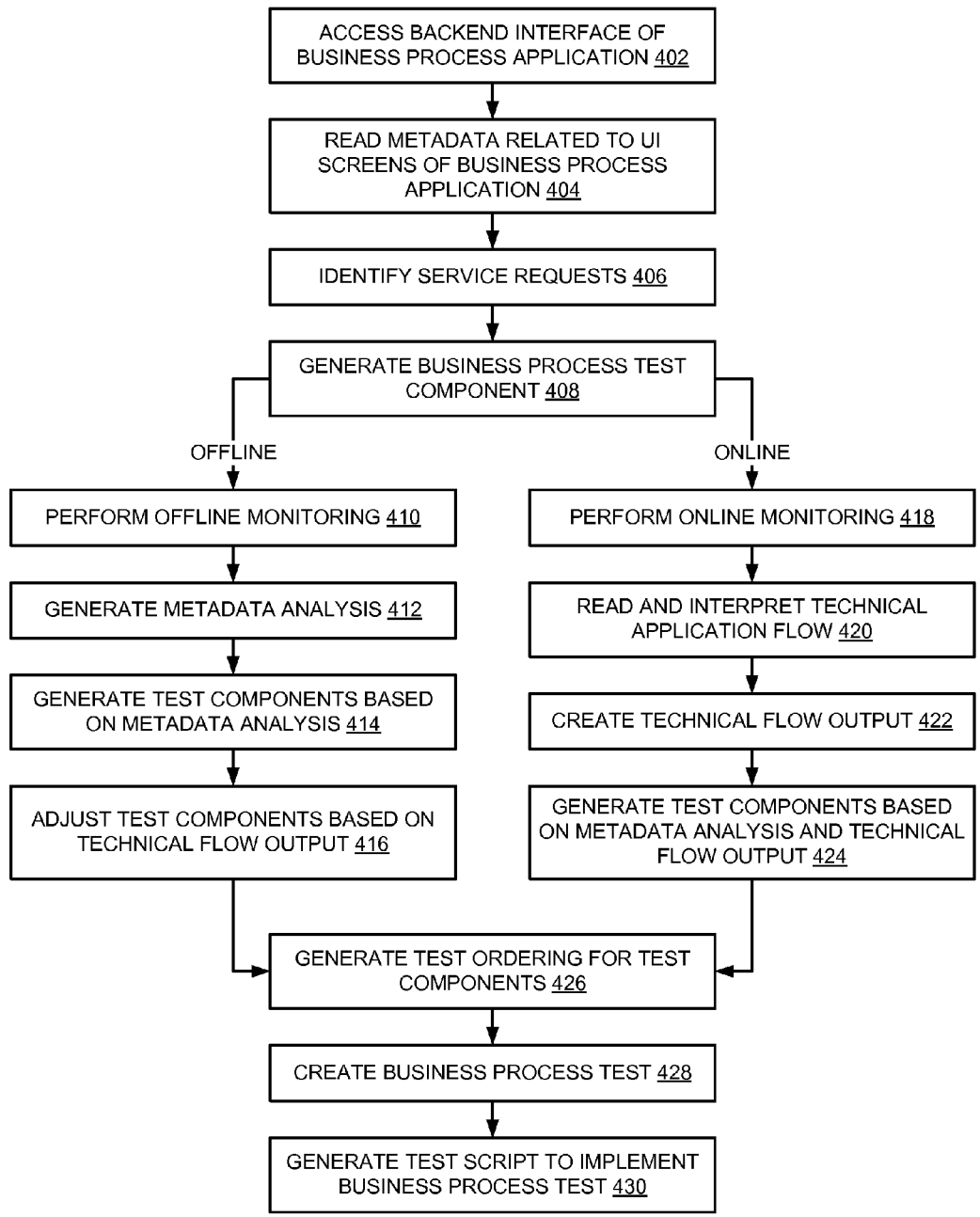
FIG. 4 is a flow diagram of an embodiment of a process for generating a business process test case.

FIG. 4 is a flow diagram of an embodiment of a process for generating a business process test case. Flow diagrams as illustrated herein provide examples of sequences of various process actions. Although shown in a particular sequence or order, unless otherwise specified, the order of the actions can be modified. Thus, the illustrated implementations should be understood only as an example, and the process for establishing the secure channel can be performed in a different order, and some actions may be performed in parallel. Additionally, one or more actions can be omitted in various embodiments of the invention; thus, not all actions are required in every implementation. Other process flows are possible.

A test suite is initialized to generate a test case for a particular system. The test system may need to perform one or multiple different business processes. The scope of the test may be dependent on the configuration as provided for initialization of the test. A business process application of a test system or a test target is initialized. The business process application includes one or more backend interfaces to the enterprise backend. The test suite accesses the backend interface of the business process application, 402. As used here, access may refer to accessing the actual interface (e.g., via an application programming interface (API)), or simply accessing the data generated at the interface.

In one embodiment, the test suite reads metadata related to UI screens of the business process application, 404. In one embodiment, the individual UI screens are the UI components from which the test case is generated. That is, a screen with various layout components, and various fields for display and/or input may be a building block component from which test cases may be generated. In one embodiment, the test suite identifies service requests, 406, for services of the backend enterprise system.

With the data accessed from a backend interface, the test suite is able to generate one or more business process test components, 408. As suggested above, the generation of business process test components may include offline and/or online aspects. Each will be described in turn. However, it is important to note that one or the other could be omitted or otherwise optional in certain implementations. Additionally, the different aspects could be performed in a way that one is dependent upon the other, or they could be implemented in a way that both are separate from each other.

In an implementation where the test suite performs offline monitoring, 410, of the business process application, the test suite may optionally generate a metadata analysis, 412. Such an analysis may or may not be persisted beyond the scope of the particular test case. The analysis could simply be temporarily stored and then purged upon generation of the test case. Alternatively, the analysis could be persisted in whole or in part. The test suite generates test components based on the metadata analysis, 414. The metadata analysis can be understood here to include information from which test components can be derived. In one embodiment, one or more test components or simply a relationship between test components can be adjusted based on a technical flow output (from an online monitoring analysis), 416.

In an implementation where the test suite performs online monitoring, 418, the test suite reads and interprets a technical application flow, 420, of the business process application. The technical application flow indicates on a low-level (e.g., via instructions, object-layer method calls, etc.) what the flow of the business process is, and what can be generated to match such a flow. In one embodiment, the test suite optionally creates a technical flow output, 422, which may or may not be persisted. The test suite can generate test components based on a metadata analysis and the technical flow output, 424. Such an implementation is one in where an offline analysis is performed prior to the online analysis. Such an order of analyses need not be followed. The metadata analysis may occur after certain online technical flow monitoring is performed, and test data relative to the online monitoring can be modified to include information derived from the offline monitoring.

Whether from online and/or offline monitoring, the test suite generates an ordering for the generated test components, 426. From the test components and the test component ordering, the test suite creates a business process test, 428. In one embodiment, the test suite generates a test script to implement the generated business process test, 430.

Besides what is described herein, various modifications may be made to the disclosed embodiments and implementations of the invention without departing from their scope. Therefore, the illustrations and examples herein should be construed in an illustrative, and not a restrictive sense. The scope of the invention should be measured solely by reference to the claims that follow.

What is claimed is:

1. A computer implemented method for business process test creation, comprising:
    monitoring a backend interface of a business process application during runtime of the business process application, the backend interface provides requests to an enterprise backend system for business objects represented by user interface (UI) elements of UI screens, the requests resulting from interaction by a user with the business process application via a UI and a frontend interface of the business process application, the frontend interface is different from the backend interface, the backend interface interfacing the business process application with the enterprise backend system, including monitoring at the backend interface transitions from one UI screen to another;
    generating, based on the monitoring, business process test components that represent discrete UI screens, including generating the business process test components based on a UI screen definition describing fields and associations of UI screens for a business process flow to be executed by the business process application;
    generating an ordering for at least a portion of the business process test components, the ordering based on the monitoring, to provide the ordering to receive input into the business process application; and
    creating a business process test from the business process test components and the ordering to provide input into the business process application to test functionality of the business process application, including testing the business process flow.

2. The method of claim 1, wherein monitoring the backend interface comprises:
reading metadata defining UI screens for the business process flow.

3. The method of claim 1, wherein monitoring the backend interface comprises:
identifying services requested from the enterprise backend system via the backend interface.

4. The method of claim 1, wherein monitoring the backend interface comprises:
reading and interpreting a technical application flow of the business process application with a real-time, online measurement of a flow inside a backend application stack.

5. The method of claim 4, further comprising:
deriving application-flow rules and application-flow deviations to describe the technical application flow for the business process application.

6. The method of claim 1, wherein monitoring the backend interface comprises:
generating a monitoring report indicating any test component definitions, application-flow rules, and application-flow deviations monitored; and further comprising:
saving at least a portion of the monitoring report to a test component ontology map that defines relationships between test components.

7. The method of claim 1, wherein generating the business process test components comprises:
generating reusable business process test components usable for multiple different business process tests.

8. The method of claim 1, wherein generating the business process test components based on the UI screen definition comprises:
generating the business process test components based on the UI screen definition in an offline state where the business process application is not executing the business process flow.

9. The method of claim 8, further comprising:
adjusting a test component definition of a business process test component generated offline with business process flow data created with an online monitoring of a technical application flow of the business process application.

10. The method of claim 1, wherein generating the ordering comprises:
determining an order of a business process flow from services requested via online monitoring of the backend interface, the order based on interpreted user interaction with the business process application as determined from a business process application flow indicated in a backend application stack.

11. The method of claim 1, wherein creating the business process test from the business process test components and the ordering comprises:
creating a test script linking multiple UI screens in accordance with the ordering.

12. An article of manufacture comprising a non-transitory computer readable storage medium having content stored thereon to provide instructions to cause a machine to perform operations including:
monitoring a backend interface of a business process application during runtime of the business process application, the backend interface provides requests to an enterprise backend system for business objects represented by user interface (UI) elements of UI screens, the requests resulting from interaction by a user with the business process application via a UI and a frontend interface of the business process application, the frontend interface is different from the backend interface, the backend interface interfacing the business process application with the enterprise backend system, including monitoring at the backend interface transitions from one UI screen to another;
generating, based on the monitoring, business process test components that represent discrete UI screens, including generating the business process test components based on a UI screen definition describing fields and associations of UI screens for a business process flow to be executed by the business process application;
generating an ordering for at least a portion of the business process test components, the ordering based on the monitoring, to provide the ordering to receive input into the business process application; and
creating a business process test from the business process test components and the ordering to provide input into the business process application to test functionality of the business process application, including testing the business process flow.

13. The article of manufacture of claim 12, wherein monitoring the backend interface comprises:
reading metadata defining UI screens for the business process flow.

14. The article of manufacture of claim 12, wherein monitoring the backend interface comprises:
reading and interpreting a technical application flow of the business process application with a real-time, online measurement of a flow inside a backend application stack.

15. A test system comprising:
an execution computing device that executes to execute a business process flow in a business process application, the execution device including:
a processor;
a non-transitory computer readable storage medium;
a frontend interface of the business process application; and
a backend interface of the business process application to access an enterprise backend system for content related to the business process flow;
an enterprise backend system to provide the content related to the business process flow in response to service requests received from the business process application; and
a test suite to monitor at the backend interface requests to the enterprise backend system for business objects represented by user interface (UI) elements of UI screens, the requests resulting from interaction by a user with the business process application via a UI and the frontend interface, wherein the test suite to monitor the business process, to detect transitions from one UI screen to another, and to generate, based on the monitoring, business process test components that represent discrete UI screens and an ordering for at least a portion of the business process test components, including the test suite to generate the business process test components based on a UI screen definition describing fields and associations of UI screens for the business process flow, where the ordering indicates an order to receive input into the business process application, the test suite further to create a business process test from the business process test components and the ordering to provide input into the business process application to test execution of functionality of the business process flow in the business process application.

16. The system of claim 15, wherein the execution device further comprises:
   a test agent having an online monitoring mechanism and an offline monitoring mechanism, the online monitoring mechanism to actively read data from an application stack, and the offline monitoring mechanism to read metadata associated with the generation of output displays.

17. The system of claim 15, wherein the test suite further comprises:
   a test monitor that monitors service requests made by the business process application to an enterprise backend.

18. The system of claim 15, wherein the test suite further comprises:
   a test case generator having a flow analyzer that concatenates multiple screens into a transaction, concatenates multiple transactions into a process, and concatenates multiple processes into an end-to-end application flow.

19. The system of claim 15, further comprising:
   an ontology map to persist relationship information about test screens generated based on the monitoring.

* * * * *